(12) United States Patent
Na

(10) Patent No.: US 7,561,418 B2
(45) Date of Patent: Jul. 14, 2009

(54) NOTEBOOK COMPUTER

(75) Inventor: Sang Ju Na, Seoul (KR)

(73) Assignee: LG Electronics Inc., Seoul (KR)

( * ) Notice: Subject to any disclaimer, the term of this patent is extended or adjusted under 35 U.S.C. 154(b) by 181 days.

(21) Appl. No.: 11/605,233

(22) Filed: Nov. 29, 2006

(65) Prior Publication Data

US 2007/0139876 A1 Jun. 21, 2007

(30) Foreign Application Priority Data

Dec. 15, 2005 (KR) ...................... 10-2005-0124180

(51) Int. Cl.
*G06F 1/16* (2006.01)
(52) U.S. Cl. ................................. 361/679.55
(58) Field of Classification Search .................. 361/683
See application file for complete search history.

(56) References Cited

U.S. PATENT DOCUMENTS 5,610,992 A * 3/1997 Hickman .................... 381/386
5,646,820 A * 7/1997 Honda et al. ................. 361/683
6,011,686 A * 1/2000 Grasso et al. ................ 361/686
6,081,421 A * 6/2000 Markow et al. ............. 361/683
6,101,088 A * 8/2000 Nakajima et al. ........... 361/686
6,243,260 B1 * 6/2001 Lundgren et al. ........... 361/683

FOREIGN PATENT DOCUMENTS

KR 10-2003-0026646 A 4/2003

* cited by examiner

*Primary Examiner*—Lisa Lea-Edmonds
(74) *Attorney, Agent, or Firm*—Birch, Stewart, Kolasch & Birch, LLP

(57) ABSTRACT

The present invention relates to installation of a speaker in a notebook computer. A notebook computer of the present invention comprises a main body including a plurality of input keys; and a display unit installed to be folded with respect to the main body. Further, a speaker is installed below the input keys of the main body. For example, the speaker is installed on a bottom surface of a keyboard plate installed below the input keys. Some of the input keys where the speaker is installed are formed with a sound-passing portion including a plurality of holes.

2 Claims, 2 Drawing Sheets

NOTEBOOK COMPUTER

BACKGROUND OF THE INVENTION

1. Field of Invention

The present invention relates to a notebook computer, and more particularly, to a notebook computer constructed to have a speaker that is advantageous to miniaturization and slimness and has sufficient sound quality to provide high-quality sound.

2. Description of the Prior Art

It can be said that there is a recent tendency for a portable notebook computer to be more miniaturized and lighter. Even such a notebook computer is provided with a speaker for performing functions such as playback of audio and video files. As shown in FIG. 1 illustrating a conventional notebook computer, the notebook computer generally comprises a main body 1 and a display unit 3 installed to be folded with respect to the main body 1. The main body 1 contains an information-processing device including a CPU and has a keyboard unit 5 with a plurality of input keys 7 installed on a top surface of the main body 1.

According to the prior art, a speaker (not shown) is generally installed in a portion a at the rear of the input keys, which corresponds to a rear end of the main body 1, or a portion Sb in front of the input keys, which corresponds to a front end of the main body 1. That is, it can be found that the speaker is conventionally installed in the portion of the top surface of the main body 1, which corresponds to a portion outside the keyboard unit 5. As shown in FIG. 1, the portion of the top surface of the main body, which is over the speaker, is formed with a plurality of through-holes Ha or Hb.

However, a variety of parts for processing data in the notebook computer are installed substantially within such portions Sa and Sb. Therefore, since different parts are installed within the portions Sa and Sb, it is considered that the portions substantially suffer from spatial limitations on installation of the speaker.

Recently, there is a tendency for a notebook computer to be miniaturized and slimmed. In consideration of the tendency of light weight and slimness as well as the limitations on installation of a speaker described above, it can be understood that there are certain limitations on installation of a relatively larger speaker with sufficient sound quality. Generally, it will be apparent that since a speaker used for a main speaker has a relatively larger size than one used for an auxiliary speaker, this speaker is somewhat difficult to install in such a narrow portion (a portion considerably suffering from spatial limitations).

SUMMARY OF THE INVENTION

Accordingly, the present invention is conceived to solve the aforementioned problems in the prior art. An object of the present invention is to provide a notebook constructed to deliver high-quality sound by installing a speaker in a relatively broader space as compared with the prior art.

A notebook computer of the present invention for achieving the object comprises a main body including a plurality of input keys and a speaker installed below the input keys; and a display unit installed to be folded with respect to the main body.

Since a signal-processing part is not substantially installed below the input keys in the notebook computer, a space can be sufficiently used and the installation of the speaker in such a space allows a relatively large speaker with high-quality sound to be easily installed. Thus, can be expected to obtain an effect that a speaker with a desired size can be installed to deliver high-quality sound in a notebook computer that is gradually miniaturized and slimmed.

Some of the input keys where the speaker is installed may be formed with a sound-passing portion including a plurality of holes. Through the sound-passing portion, sound generated from the speaker can be efficiently delivered to the outside.

In this embodiment, the speaker may be installed on a bottom surface of a keyboard plate installed below the input keys. In this case, some of input keys and the keyboard plate may have a sound-passing portion including a plurality of holes formed at positions corresponding to a portion where the speaker is installed.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENT

Hereinafter, the present invention will be described in greater detail with reference to the accompanying drawings.

Figure 1:
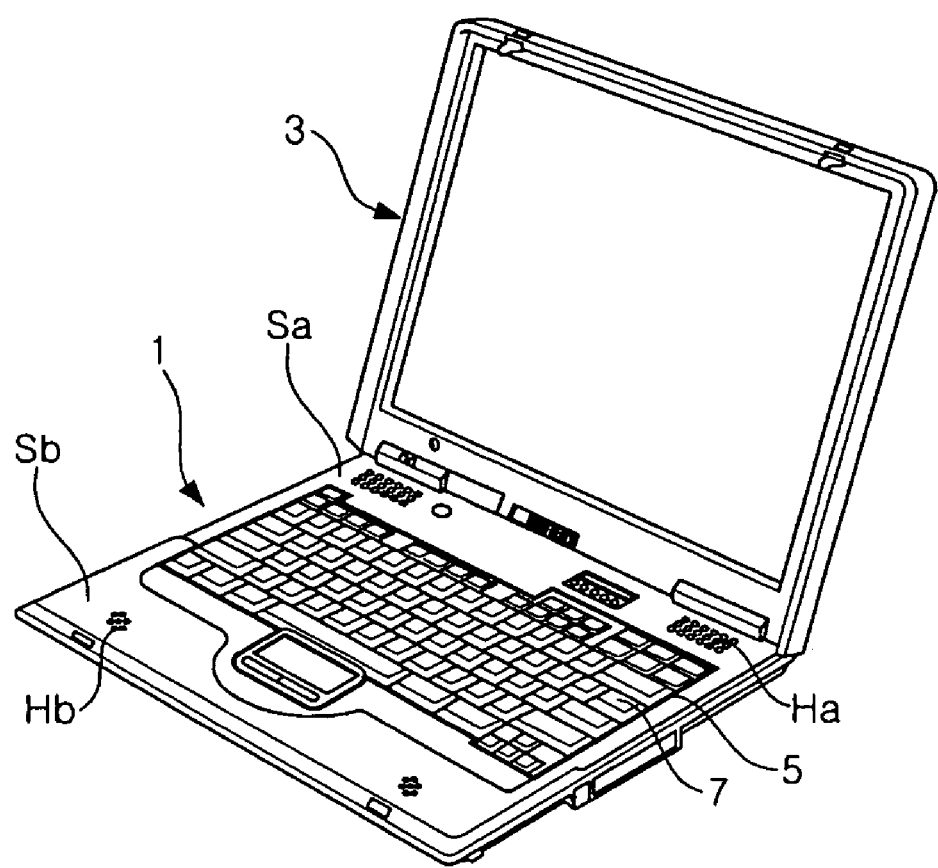
FIG. 1 is a perspective view illustrating a conventional notebook.
Figure 2:
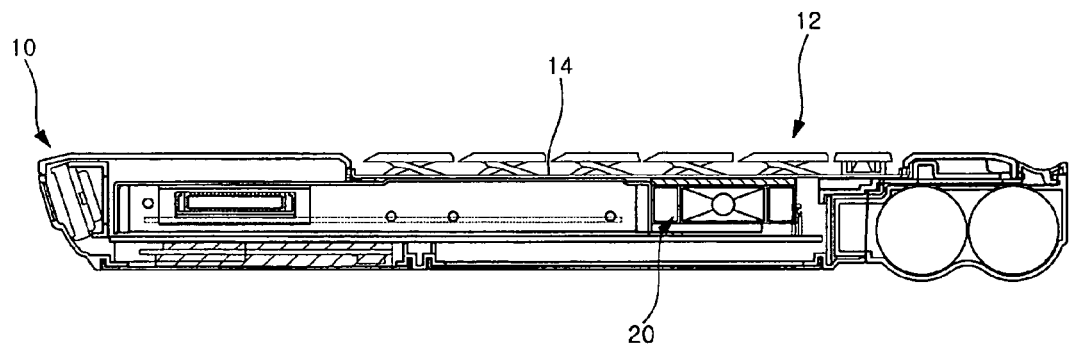
FIG. 2 is an exemplary view showing a section of a notebook computer according to the present invention.
Figure 3:
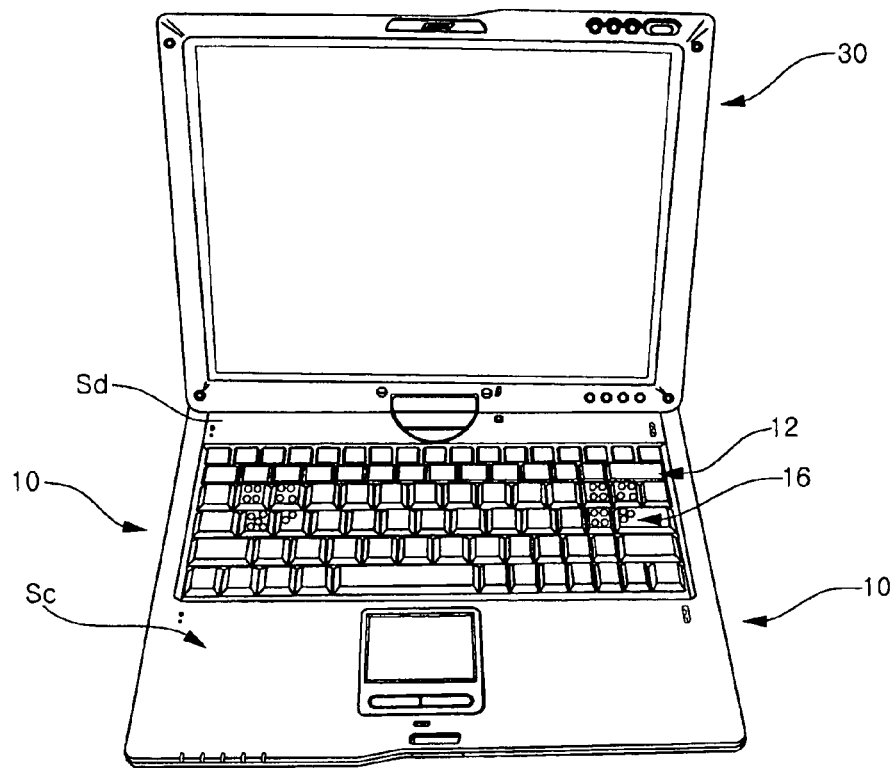
FIG. 3 is a perspective view illustrating the notebook computer according to the present invention.

FIG. 2 is a sectional view showing a section of a main body of a notebook computer with a speaker according to the present invention, and FIG. 3 is a perspective view illustrating the notebook computer with a speaker according to the present invention.

As shown in FIGS. 2 and 3, the notebook computer of the present invention comprises a main body 10 with data-processing parts contained therein, and a display unit 30 installed to be folded with respect to the main body so as to display data thereon. The main body 10 of the notebook computer includes a plurality of input keys 12, and a speaker 20 installed below the input keys 12 so as to provide sound.

The plurality of input keys 12 is installed on a top surface of the main body 10 of the notebook computer. The input keys 12 are elastically supported substantially on a keyboard plate 14. In the present invention, the speaker 20 is installed below the keyboard plate 14 that is placed under the input keys 12.

In the notebook computer, the portion below the plurality of input keys 12 can be considered as a portion where other electronic components are not installed substantially. That is, it can be seen from FIG. 3 that signal-processing parts to be installed within the main body 10 of the notebook computer are mainly mounted in a portion Sc and a portion Sd that are outside the input keys 20. Therefore, the portion below the input keys 12 is a portion where many parts are not intensively arranged, and can be considered as a portion of which the space can be more efficiently utilized.

The subject matter of the present invention is to easily install a main speaker with a relatively larger size by installing the speaker below the input keys 12 as above. In the present invention, the use of the space below the plurality of input keys 12 allows a speaker capable of delivering sufficient sound quality to be easily installed even in a recent notebook computer that is gradually miniaturized and slimmed. That is, according to the present invention, the use of the space below the input keys 12 can solve limitations on installation space of a speaker to be installed in a notebook computer.

Since a speaker is installed in either of portions Sc and Sd in front of and at the rear of the input keys 12 in a conventional notebook computer, it suffers from limitations on installation space due to other electrical parts substantially installed at such portions. For this reason, it is pointed out that there are spatial limitations on installation of a main speaker capable of delivering relatively high-quality sound.

In the present invention, the speaker 20 is installed in the space below the input keys 12, which has a relatively high degree of utilization of space, as described above. Thus, it can be understood that limitations on the size of the speaker 20 is alleviated and a speaker capable of delivering high-quality sound is more easily installed.

When the speaker 20 is installed below the input keys 12, specifically on a bottom surface of the keyboard plate 14, it is desirable to communicate the speaker 20 with a portion above the input keys 12 so as to deliver sound generated from the speaker in an upward direction (above the notebook computer). Although the main body 10 of the notebook computer, particularly the interior of the portion of the main body where the input keys 12 are installed is not in a completely hermetical state, it is desirable to form a sound-passing portion 16 comprising a plurality of holes in a portion of the input keys 12 corresponding to the position of the speaker 20, as shown in FIG. 3.

The sound-passing portion 16 enables the sound generated from the speaker 20 to be more accurately and efficiently delivered to the outside. In the illustrated embodiment, the sound-passing portion 16 is formed directly in some of the input keys 12. Even though the sound-passing portion 16 is formed directly in some of the input keys 12 in such a manner, there is no difficulty in operating the input keys 12 for inputting data. In a case where the speaker 20 is installed on the bottom surface of the keyboard plate 14, it is preferred that the keyboard plate 14 be also formed with a plurality of holes for delivering sound.

As described above, it can be understood that the basic technical spirit of the present invention is to install a speaker below the input keys, which has a relatively high degree of utilization of space in a notebook computer.

According to the present invention described above, it can be understood that the speaker 20 is installed below the input keys 12. As explained above, the portion below the input keys 12 is a portion having a relatively higher degree of utilization of space than other portions. Therefore, it is possible to easily install a speaker with a specification capable of delivering high-quality sound in a notebook computer. Further, since the speaker is installed by using the portion below the input keys in the notebook computer in accordance with the present invention, it is possible to deliver high-quality sound while meeting the tendency of slimness and light weight in a notebook computer.

It will be apparent to those skilled in the art that various modifications and changes can be made within the basic technical spirit of the present invention and the scope of the present invention should be construed based on the appended claims.

What is claimed is:

1. A notebook computer, comprising:
 a main body including a plurality of input keys and a speaker installed below the input keys; and
 a display unit installed to be folded with respect to the main body,
 wherein the speaker is installed on a bottom surface of a keyboard plate installed below the input keys.

2. The notebook computer as claimed in claim 1, wherein some of input keys and the keyboard plate have a sound-passing portion including a plurality of holes formed at positions corresponding to a portion where the speaker is installed.

* * * * *